United States Patent [19]
Mikamo

[11] Patent Number: 5,392,267
[45] Date of Patent: Feb. 21, 1995

[54] OPTICAL CARD READING AND WRITING METHOD WITH REDUNDANT DIRECTORY STORAGE TO IMPROVE RELIABILITY

[75] Inventor: Noboru Mikamo, Tokyo, Japan

[73] Assignee: Olympus Optical Co., Ltd., Tokyo, Japan

[21] Appl. No.: 998,133

[22] Filed: Dec. 29, 1992

[30] Foreign Application Priority Data

Jan. 8, 1992 [JP] Japan ................................ 4-001589

[51] Int. Cl.$^6$ ............................................. G11B 7/00
[52] U.S. Cl. ...................................... 369/47; 369/48; 369/58; 369/32
[58] Field of Search ........................ 369/47, 48, 54, 58, 369/124, 32, 59; 360/48

[56] References Cited

U.S. PATENT DOCUMENTS

| | | | |
|---|---|---|---|
| 4,791,623 | 12/1988 | Deiotte | 360/48 |
| 5,107,481 | 4/1992 | Miki et al. | 369/58 |
| 5,111,444 | 5/1992 | Fukushima et al. | 369/58 |
| 5,132,956 | 7/1992 | Ichikawa | 369/58 |

Primary Examiner—Georgia Y. Epps
Assistant Examiner—Mohammad N. Edun
Attorney, Agent, or Firm—Stevens, Davis, Miller & Mosher

[57] ABSTRACT

In a method of recording and/or reproducing information consisting of directory data and actual data on an optical card having first and second directory data record regions and first and second actual data record regions, the same actual data are recorded in the first and second actual data record regions, the same directory data including position data denoting tracks in the first and second actual data record regions on which the actual data have been recorded are recorded in the first and second directory data record regions. Upon reproduction, at first the directory data recorded in the first directory data record region are read out and if this directory data can be read out correctly, the actual data recorded in the first actual data record region are read out under the control of the position data included in the read-out directory data. If the actual data can not be read out correctly, then the actual data in the second actual data record region are read out in accordance with the position data in the read-out directory data. When the directory data can not be correctly read out of the first directory data record region, the directory data are read out of the second directory data record region, and the actual data recorded in the first or second actual data record region is read out under the control of the position data included in the directory data read out of the second directory data record region.

7 Claims, 7 Drawing Sheets

FIG_3

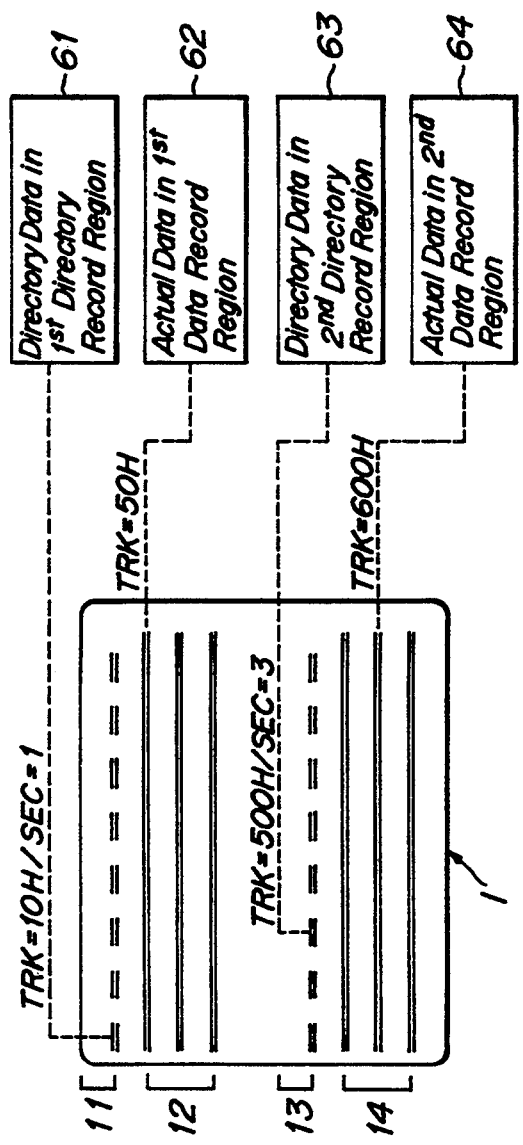

FIG_8
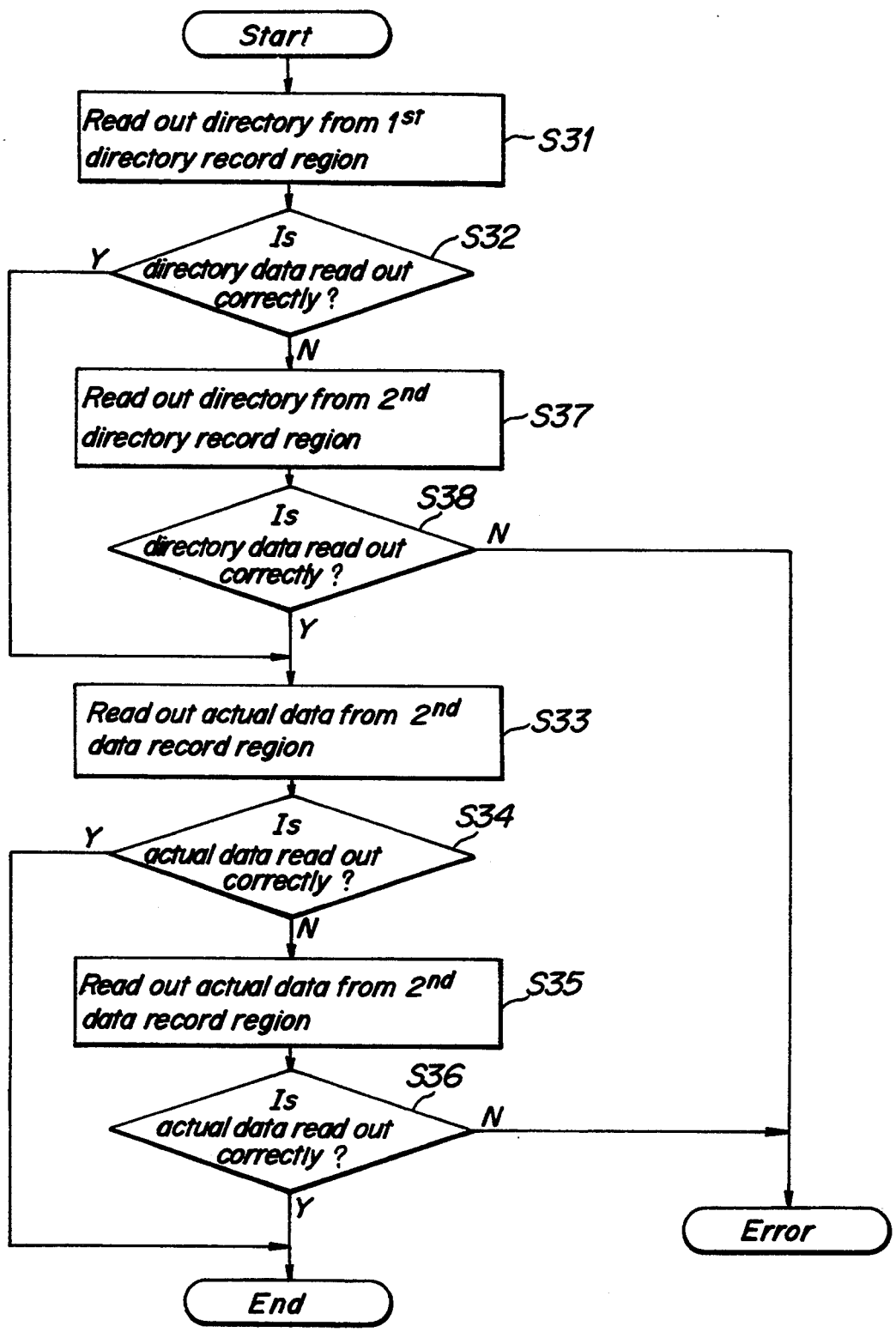

OPTICAL CARD READING AND WRITING METHOD WITH REDUNDANT DIRECTORY STORAGE TO IMPROVE RELIABILITY

BACKGROUND OF THE INVENTION

1. Field of the Invention

The present invention relates to a method of recording and/or reproducing information on and/or from an optical record medium such as optical card and optical disk, and more particularly relates to a method of recording and/or reproducing information on and/or from a plurality of different data record regions on the same optical record medium in order to positively record and/or reproduce the information.

2. Description of the Related Art

In case of using an optical record medium such as an optical card, when a surface of a data record area is injured or stained, it is sometimes impossible to read out the data recorded in the data record region. In order to record and/or reproduce the data in positive manner, there have been proposed various recording and/or reproducing methods. For instance, there has been proposed an error correction method in which an error in a reproduced signal due to the injury or stain of the surface of the data record region is corrected in accordance with a predetermined error correction rule. It is further proposed to record the same data in different data record regions on the same optical record medium. There is a limitation in increasing the reliability of the error correction, so that in addition to the error correction, the duplicate recording of the data in different data record regions is utilized.

In a known method of recording the same data in different data record regions on the same optical card, there are provided a plurality of directory data record regions and a plurality of actual data record regions on the same optical card and directory data and actual data constituting the information are recorded on two different directory regions and two different actual data record regions, respectively.

FIG. 1 is a plan view showing an example of an optical card which may be used in the above mentioned duplicate recording method. As illustrated in FIG. 1, the optical card includes first and second directory data record regions 11 and 13 and first and second actual data record regions 12 and 14. After the actual data of information are recorded in the first actual data record region 12, the directory data indicating the position in the first actual data record region in which the relevant data are recorded are recorded in the first directory data record region 11, and similarly, after the same actual data are recorded in the second actual data record region 14, the directory data denoting a position in the second actual data record region in which the actual data are recorded are recorded in the second directory data record region 13. In this manner, in the known method of recording the information on the optical card, the directory data recorded in the different directory record regions have no relation to each other. That is to say, in each directory record region, only the directory data for managing the actual data recorded in the related actual data record region are recorded. Therefore, the improvement in the data record reliability and the efficiency in the data reproducing could not be attained optimally.

FIG. 2 is a flow chart representing a known method of reproducing the information which has been recorded on the optical card in the manner explained above. In a step S1, the directory data recorded in the first directory data record region 11 are read out. Then, in a step S2, it is checked whether the directory data have been correctly read out or not. In the step S2, when the directory data have been confirmed to be read out correctly, then in a step S3, the actual data recorded in the first actual data record region 12 are read out under the control of the directory data. Next, in a step S4, it is checked whether the actual data have been read out correctly or not. When it is confirmed that the actual data have been read out correctly, the reproducing operation is completed.

However, if the directory data have not been correctly read out of the first directory data record region 11 in the step S2, then the directory data recorded in the second directory data record region 13 is read out in a step S5. After that, in a step S6, it is checked whether the directory data can be correctly read out of the second directory data record region 13 or not. If it is confirmed that the directory data have been correctly read out of the second directory data record region 13, then in a step S7 the actual data recorded in the second actual data record region 14 are read out under the control of the directory data read out of the second directory data record region 13, and then in a step S8 it is further checked whether the actual data have been correctly read out or not.

In the step S6, it is confirmed that the directory data could not be correctly read out of the second directory data record region 13, then it is judged the process is ended with an error message in a step S9.

In the known method of recording and/or reproducing the information on and/or from the optical card, if the directory data recorded in the first directory data record region 11 could not be read out correctly, the directory data are read out of the second directory data record region 13, and the actual data are read out of the second actual data record region 14 in accordance with the directory data read out of the second directory data record region. In this case, if the actual data could not be read correctly out of the second actual data record region 14 due to the injury or stain of the second actual data record region, it is no longer possible to read the actual data out of the optical card. Further, even when the directory data are correctly read out of the first directory data record region 11, the actual data could not be read out the optical card if the first actual data record region 12 is injured.

SUMMARY OF THE INVENTION

The present invention has for its object to provide a novel and useful method of recording and/or reproducing information on and/from an optical record medium, in which the reliability of the information recorded on the optical record medium can be improved and the possibility of reading the information correctly from the optical record medium can be increased.

According to the invention, a method of recording and/or reproducing information consisting of directory data and actual data on and/or from an optical record medium having a plurality of directory data record regions and a plurality of actual data record regions comprises the steps of:

recording a plurality of the same actual data of the information in said plurality of actual data record regions, respectively;

forming directory data including managing data of said information as well as position data denoting positions in said plurality of actual data record regions at which said plurality of the same actual data of the information have been recorded;

recording a plurality of said directory data in said plurality of directory data record regions, respectively;

reading at least one of said plurality of directory data of the information from at least one of said plurality of directory data record regions; and reading one of said plurality of actual data of the information from one of said plurality of actual data record regions under the control of the position data included in the read-out directory data.

The present invention also relates to a method of recording information consisting of directory data and actual data on an optical record medium having a plurality of directory data record regions and a plurality of actual data record regions comprising the steps of:

recording a plurality of the same actual data of the information in said plurality of actual data record regions, respectively;

forming directory data including managing data of said information as well as position data denoting positions in said plurality of actual data record regions at which said plurality of the same actual data of the information have been recorded; and recording a plurality of said directory data in said plurality of directory data record regions, respectively.

The present invention further relates to a method of reproducing information recorded on an optical record medium having a plurality of directory data record regions and a plurality of actual data record regions, in said plurality of actual data record regions being recorded a plurality of the same actual data and in said plurality of directory data record regions being recorded a plurality of directory data including managing data for managing the information and position data denoting positions in said plurality of actual data regions at which said plurality of actual data have been recorded, comprising the steps of:

1) reading the directory data recorded in one of said plurality of directory data regions;

2) checking whether or not the directory data have been correctly read out of said one of a plurality of directory data record regions;

repeating said steps 1) and 2) until the directory data are confirmed to be correctly read out the optical record medium;

4) reading the actual data recorded in one of said plurality of actual data record regions under the control of the position data included in said directory data.

In the method according to the invention, in each of a plurality of directory data record regions, there are recorded the directory data which denote all positions in all of a plurality of actual data record regions at which a plurality of the same actual data have been recorded, so that even if the actual data recorded in one of a plurality of actual data record regions can not be read out correctly, a possibility that the actual data can be correctly read from another one of a plurality of actual data record regions is extremely increased. In other words, according to the invention, if the directory data can be correctly read out of at least one of a plurality of directory data record regions and the actual data can be correctly read out of at least one of a plurality of actual data record regions, the actual data can be positively read out without fail.

BRIEF DESCRIPTION OF THE DRAWINGS

FIG. 6 is a schematic view showing an example of the directory format according to the invention;

FIG. 7 is a schematic view illustrating the arrangement of the data recorded on the optical card; and FIG. 8 is a flow chart representing successive steps of the information reproducing method according to the invention.

DESCRIPTION OF THE PREFERRED EMBODIMENTS

Figure 3:
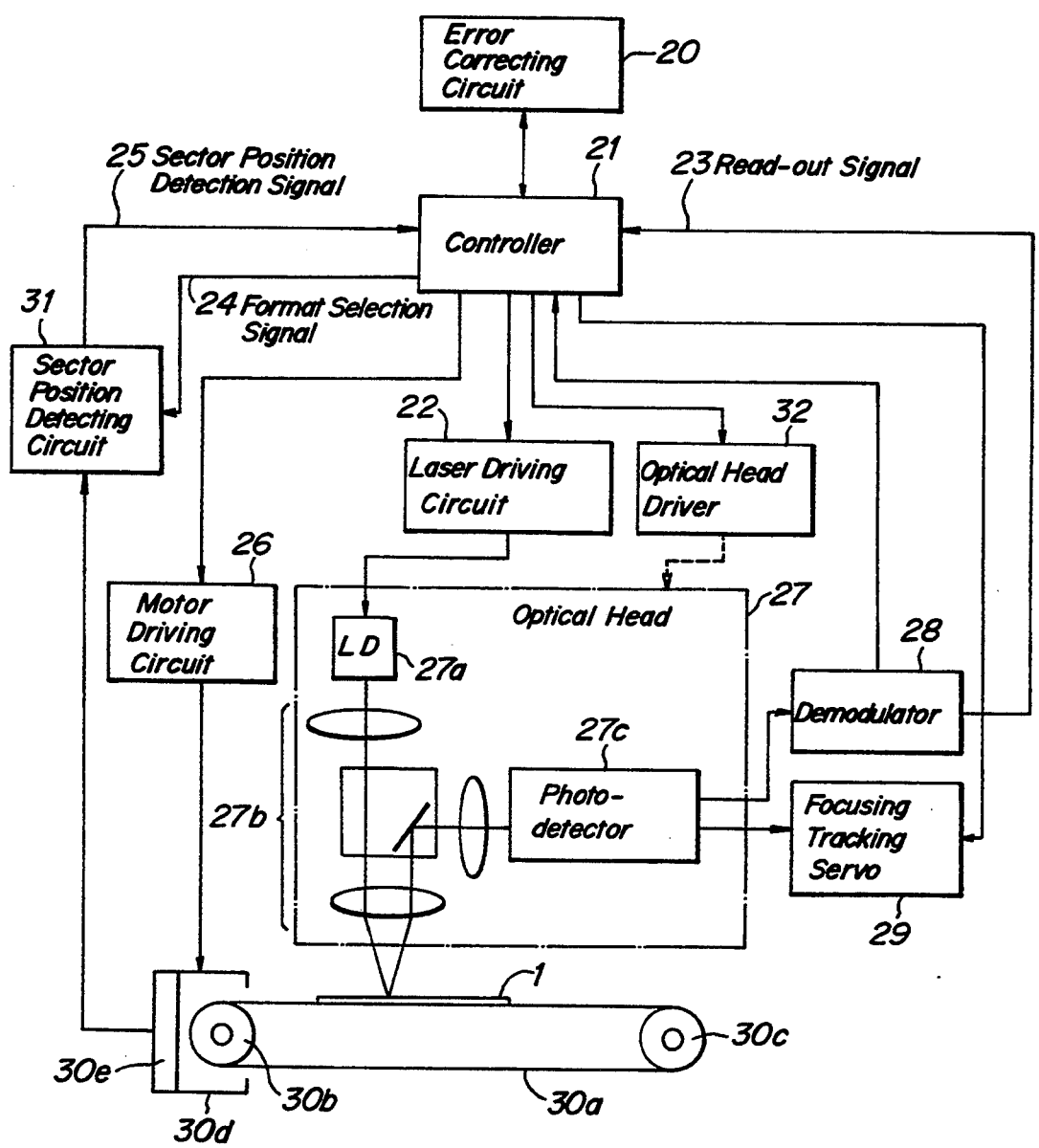
FIGS. 3 and 4 are block diagrams illustrating an embodiment of the recording and reproducing apparatus for effecting the method according to the invention.
Figure 4:
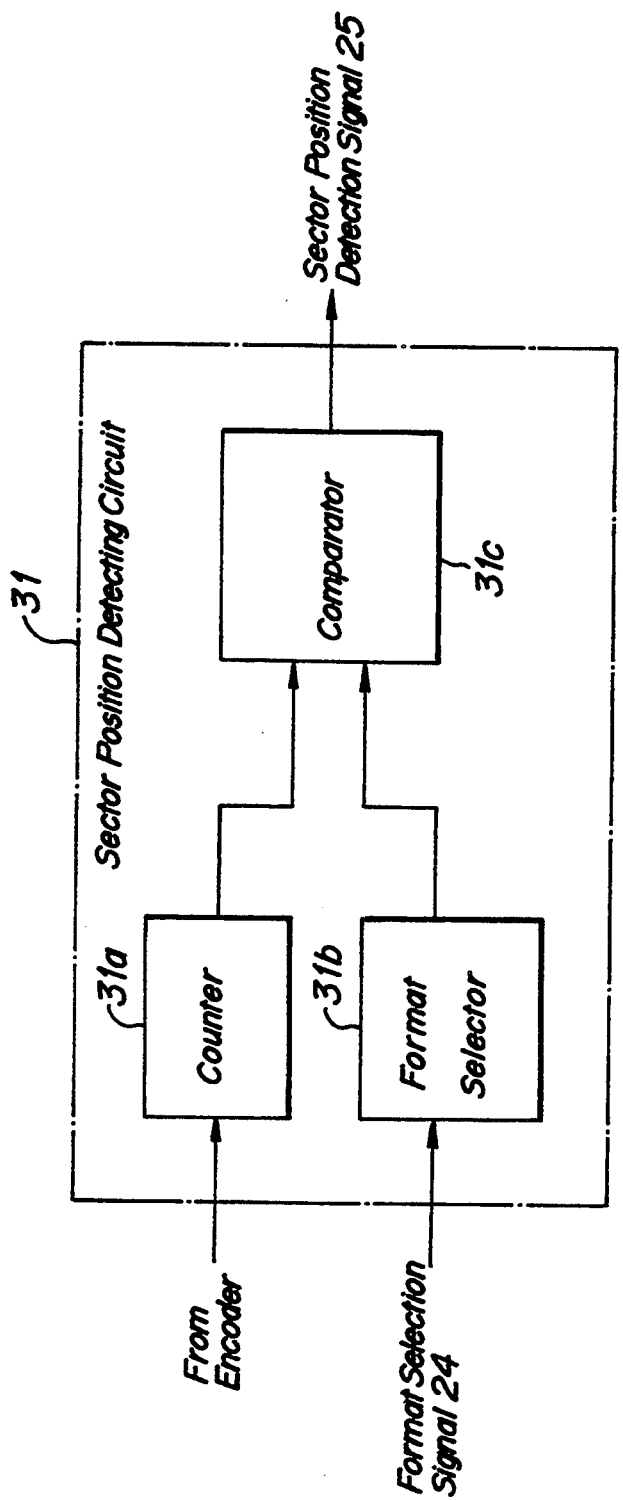

FIGS. 3 and 4 are block diagrams showing the construction of the optical card writing and reading apparatus for performing the information recording and/or reading method according to the invention. In the present embodiment, the data recording and reading are carried out by moving an optical card 1 in a track direction in which tracks on the optical card extend as well as in a direction perpendicular to the track direction. The optical card 1 is placed at a given position on an endless belt 30a which is mounted between a pair of pulleys 30b and 30c. The pulley 30b is coupled with a driving motor 30d which is connected to a motor driving circuit 26, so that the optical card 1 is moved reciprocally in the track direction. In order to detect a position of the optical card 1 with respect to an optical head 27, a rotary encoder 30e is coupled with the driving motor 30b. An output signal of the rotary encoder 30e is supplied to a sector position detecting circuit 31. In the sector position detecting circuit 31, a recording or reproducing start point for a respective sector is detected on the basis of the output signal supplied from the rotary encoder 30e. The optical head 27 is constructed such that a writing or reading light beam emitted by a laser light source 27a is projected onto the optical card 1 by means of an optical system 27b. Light reflected by the optical card 1 is detected by a photodetector 27c. An output signal of the photodetector 27c is supplied to a demodulating circuit 28 to derive a read-out signal 23. At the same time, an output signal of the photodetector 27c is supplied to a focusing and tracking servo circuit 29 which controls the position of the optical system 27b with respect to the optical card 1 such that the light beam is always focused on the optical card 1. The read-out signal 23 is supplied to a controller 21 to derive a data signal, a track address signal, etc. During the reproduction, the controller 21 supplies a format selection signal 24 to the sector position detecting circuit 31. The controller 21 further supplies a control signal to a laser driving circuit 22 so that the laser diode 27a emits a laser light beam having a lower intensity. The controller 21 further supplies a control signal to the motor driving circuit 26 to move the endless belt 30a in a given direction. There is further provided an optical head driving device 32 for moving the optical head 27 in the direction perpendicular to the track direction. The controller supplies a control signal to this optical head driving device 32 such that the optical head 27 is moved in the direction perpendicular to the track direction. In this manner, the laser beam can be made incident upon a desired track on the optical card 1 to effect a so-called seek operation.

During the reading operation, the sector position detection signal 25 is supplied to the controller 21 from the sector position detecting circuit 31, and the read-out signal 23 is supplied to the controller 21 from the demodulating circuit 28. The controller 21 supplies the format selection signal 24 to the sector position detecting circuit 31 and the control signals to the laser driving circuit 22, motor driving circuit 26 and optical head driving circuit 32, so that a desired sector are sought and the data recorded in this sector is read out. The read-out signal is supplied from the controller 21 to an error correction circuit 20, and an error correction is performed in accordance with a predetermined error correcting method to derive a given data signal.

Upon recording data on the optical card 1, the format selection signal 24 is first supplied from the controller 21 to the sector position detecting circuit 31 to select a given sector format. At the same time, the control signals are supplied from the controller 21 to the laser driving circuit 22, motor driving circuit 26 and optical head driving device 32, and then a desired sector in a desired track on the optical card 1 is sought. The intensity of the laser beam emitted from the laser light source 27a is modulated in accordance with the data to be recorded. In this manner the data can be written in the desired sector in the desired track on the optical card 1.

FIG. 4 is a block diagram showing an embodiment of the sector position detecting circuit 31. The sector position detecting circuit 31 comprises a counter 31a for counting the output pulses supplied from the rotary encoder 30e, a format selector 31b for generating a predetermined reference count value on the basis of the format selection signal 24, and a comparator 31c for comparing the output count value of the counter 31a and the reference count value supplied from the format selector 31b. When the count value of the counter 31a becomes equal to the reference count value, the comparator 31c generates the sector position detection signal 25. The counter 31a is reset when the optical card 1 is in a reference position with respect to the optical head 27. This reference position may be set to be an edge of the optical card 1. The sector position detection signal 25 is supplied to the controller 21, and then the controller counts this sector position detection signal 25. In this manner, it is possible to identify respective sectors in a track.

Figure 1:
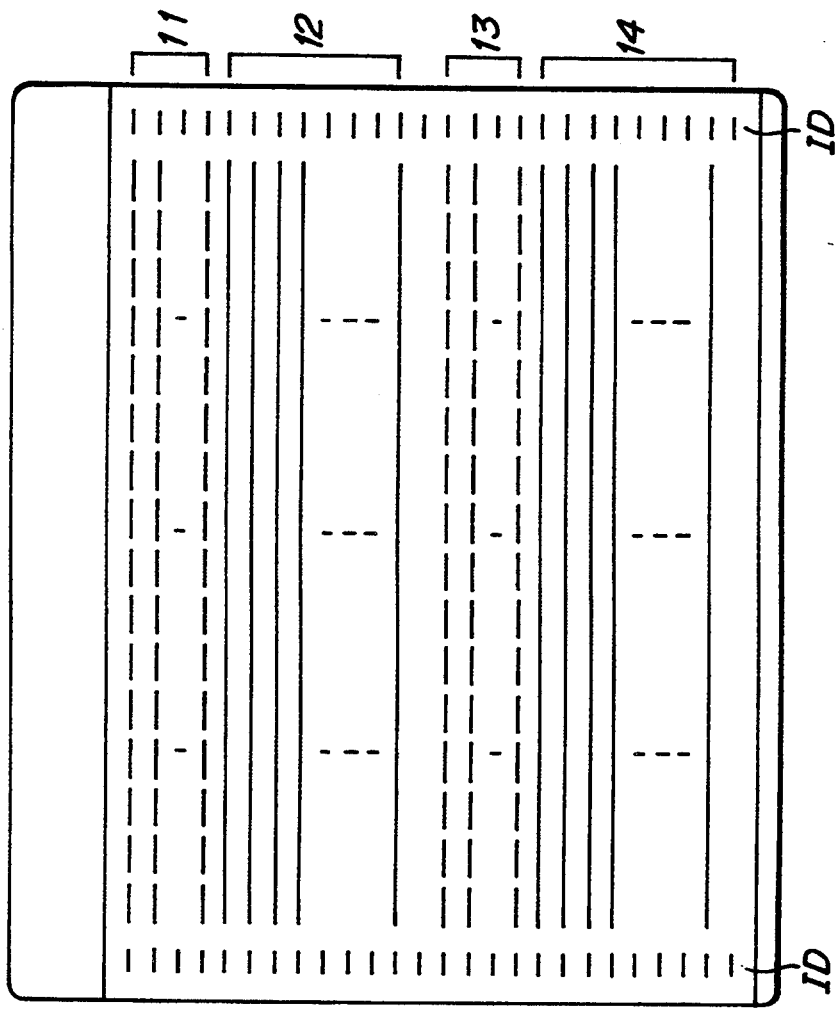
FIG. 1 is a plan view showing the data format of a known optical card.
Figure 2:
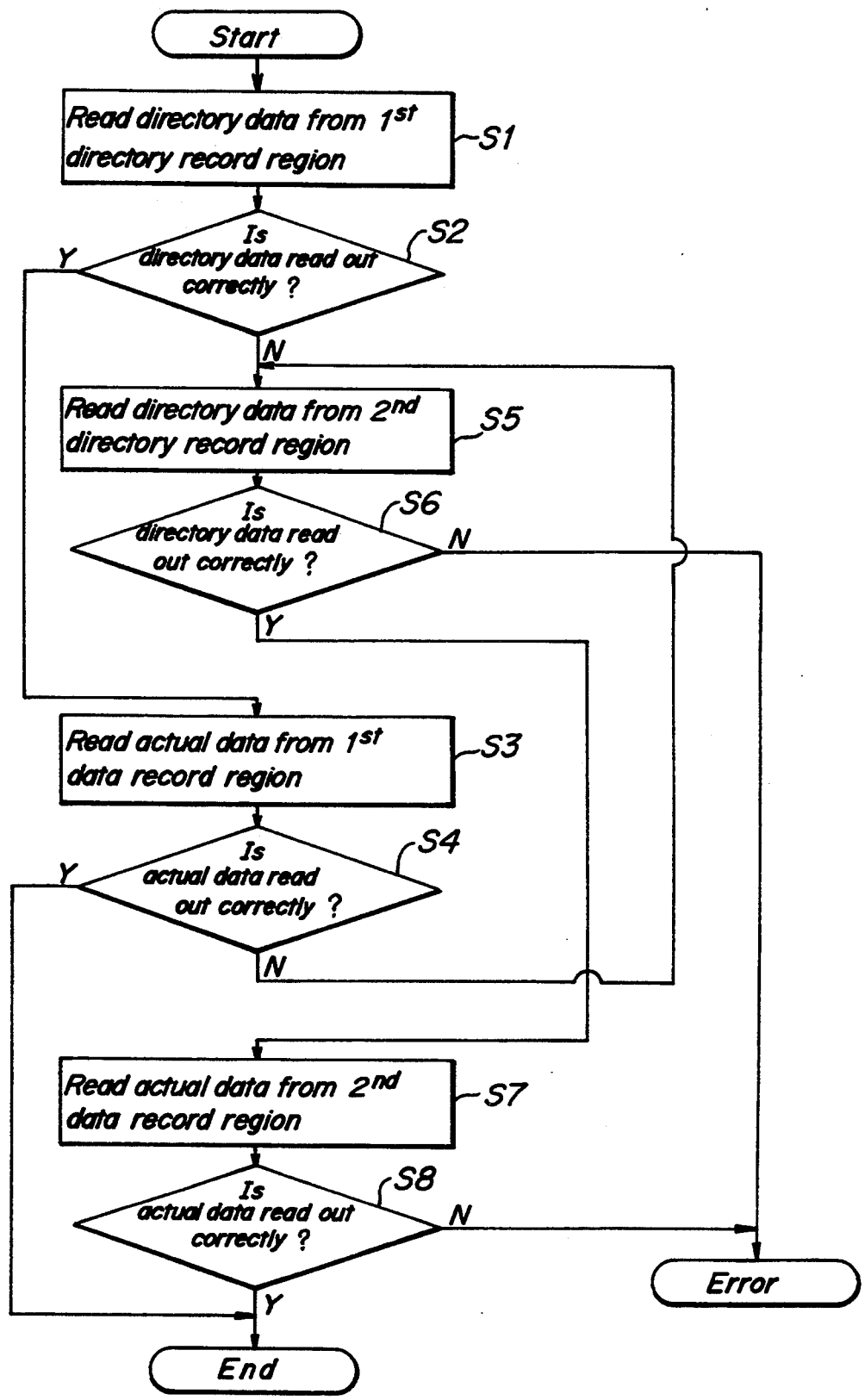
FIG. 2 is a flow chart representing successive steps of a known method of reading the data out of the optical card.

Now the information recording and/or reproducing method according to the invention will be explained in detail. In the present embodiment, use is made of the optical card 1 shown in FIG. 1. It should be noted that the optical card 1 itself is known.

As explained above, the optical card 1 includes the first and second directory data record regions 11 and 13 and the first and second actual data record regions 12 and 14. Now it is assumed that actual data and directory data of a file entitled OL1.DAT are to be recorded in the first and second directory data record regions 11, 13 and actual data record regions 12, 14, respectively in duplicate.

Figure 5:
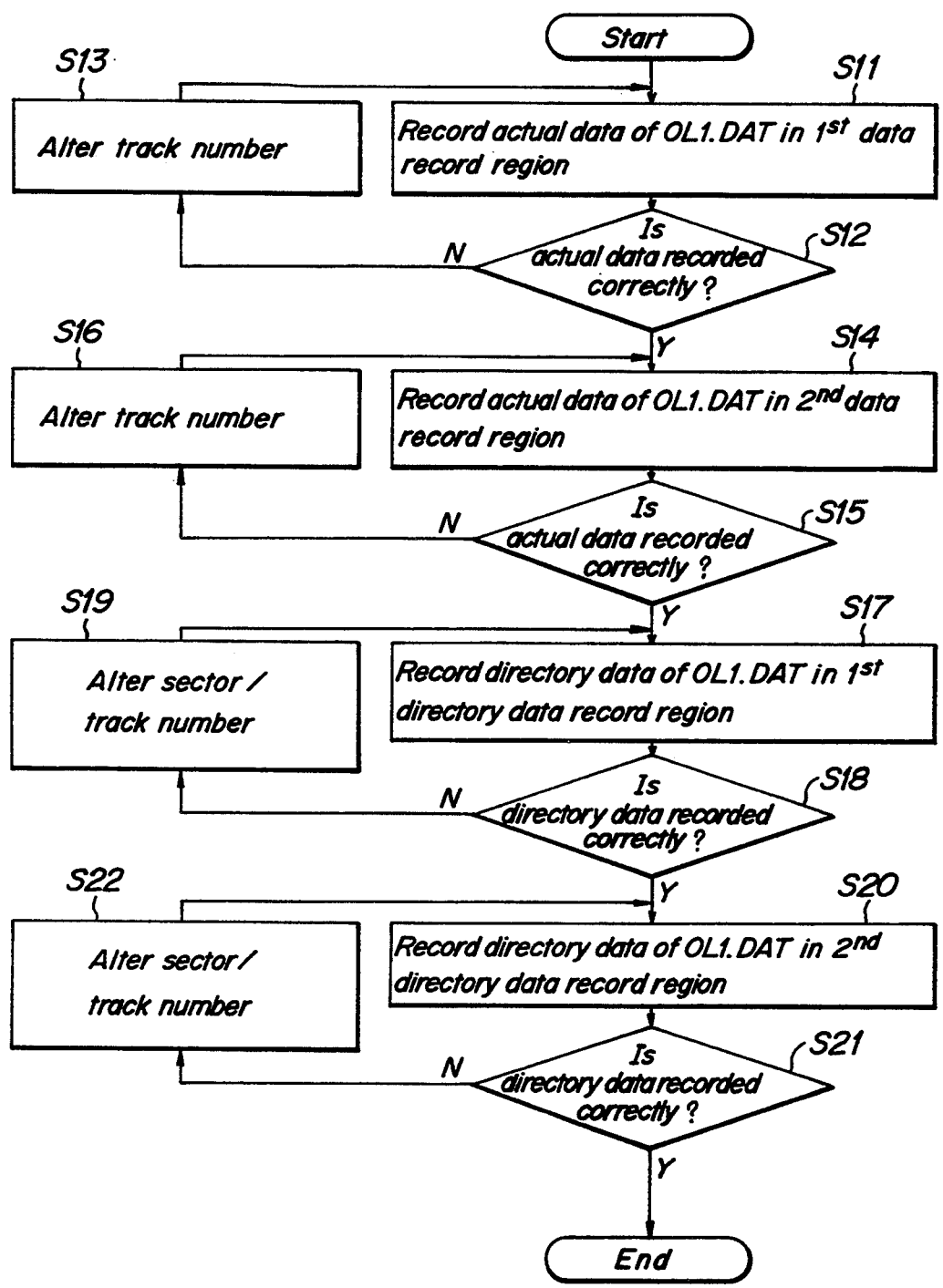
FIG. 5 is a flow chart denoting successive steps of the information recording method according to the invention.

FIG. 5 is a flow chart showing successive steps of the information recording method according to the invention. In a step S11, the actual data of the file OL1.DAT are recorded in a given track in the first actual data record region 12. Then, in a step S12, it is checked whether the relevant actual data have been recorded correctly or not. If it is confirmed that the actual data have not been recorded correctly due to various factors such as dust or injury on the relevant track and focusing and tracking errors, then, in a step S13, the track number in the first actual data record region 12 is altered in accordance with a predetermined rule, and after that the actual data of the file OL1.DAT are recorded again on the altered track in the first actual data record region 12.

In the step S12, when it is confirmed that the relevant actual data have been correctly recorded, then the relevant track number TRK=50H is stored in a memory in the controller 21. Then, in a step S14, the same actual data of the file OL1.DAT are recorded on a given track in the second actual data record region 14. Next, in a step S15, it is checked whether the actual data have been correctly recorded or not, and if the actual data have not been correctly recorded, then in a step S16, the track number in the second actual data record region 14 is altered. Then, the actual data of the file OL1.DAT are recorded again on an altered track in the second data record region 14. When it is confirmed that the actual data of the file OL1.DAT has been correctly recorded in the second data record region 14, the relevant track number TRK=600H is stored in the controller 21.

FIG. 6 is a schematic view showing an example of the directory data format. The directory data include file name 51, file size 52, date 53, time 54, track number 55 in the first actual data record region 12 and track number 56 in the second actual data record region 14, in which tracks the same actual data of the information OL1.DAT have been recorded correctly. As explained above, the track numbers TRK=50H and TRK=600H in which the same data of the file OL1.DAT have been correctly recorded are stored in memory of the controller 21. These track numbers TRK=50H and TRK=600H are read out of the memory and the directory data including these track numbers are formed. According to the invention, the directory data include a plurality of track numbers which denote a plurality of tracks in a plurality of actual data record regions in which the same actual data have been correctly recorded.

Next, in a step S17, the directory data thus formed are recorded in the first directory data record region 11, and after that in a step S18, it is checked whether the directory data have been correctly recorded or not. If it is detected that the directory data have not been correctly recorded in the first directory data record region 11, then in a step S19, the sector number or track number is altered, and the directory data are recorded again in the altered sector or track in the first directory data record region 11. When it is confirmed that the directory data have been correctly recorded in the first directory record region 11, the same directory data are recorded in the second directory data record region 13 in a step S20, and the recorded directory data are checked in a step S21. If is it confirmed that the directory data have not been correctly recorded in the second directory data record region 13, the sector number or track number is altered in a step S22, and the same directory data are recorded again in the altered sector or track in the second directory data record region 13. When it is confirmed that the directory data have been correctly recorded in the second directory data record region 13, the data recording process is completed.

FIG. 7 is a schematic plan view showing the optical card 1 on which the directory data and the actual data of the file OL1.DAT have been recorded in the manner explained above. In this example, the actual data 62 are recorded in the track having the track number TRK=50H in the first actual data record region 12, and the same actual data 64 are recorded in the track having the track number TRK=600H in the second actual data record region 14, and the directory data 61 are recorded in the sector having the sector number SEC=1 in the track of the track number TRK=10H in the first directory data record region 11, and the same directory data 63 are recorded in the sector of the sector number SEC=3 in the track having the track number TRK=500H in the second directory data record region 13.

FIG. 8 is a flow chart showing successive steps of the information reproducing method according to the invention using the optical card 1 on which the information has been recorded as illustrated in FIG. 7. In a step S31, at first the directory data 61 recorded in the sector SEC=1, track TRK=10H in the first directory data record region 11 are read out. Then, it is checked whether the directory data have been correctly read out or not in a step S32. If it is confirmed that the directory data have been correctly read out of the first directory data record region 11, then in a step S33, the actual data 62 are read out of the first actual data record region 12 under the control of the track number TRK=50H included in the read out directory data 61. Next, in a step S34, it is checked whether the actual data have been correctly read out or not, and if it is confirmed that the actual data could not be correctly read out of the first actual data record region 12, then in a step S35, the actual data are read out of the second actual data record region 14 under the control of the track number TRK=600H included in the previously read-out directory data.

In the step S32, if it is judged that the directory data 61 have not been correctly read out of the first directory data record region 11, then in a step S37, the directory data 63 are read out of the second directory data record region 13. Next, in a step S38, it is confirmed that the directory data have been correctly read out of the second directory data record region 13. When it is confirmed that the directory data have been correctly read out of the second directory data record region 13, then the step S33 is performed to read the actual data 62 stored in the first actual data record region 12 under the control of the track number TRK=50H included in the directory data. Further, if the actual data 62 could not be read out correctly, then the actual data 64 are read out of the second actual data record region 14 in the step S35 under the control of the track number TRK=600H included in the directory data.

In the manner explain above, in the information recording and reproducing method according to the invention, if the directory data can be read out correctly from at least one of a plurality of directory data record regions and if the actual data can be read out correctly from at least one of a plurality of actual data record regions, it is always possible to read out the actual data correctly. In this manner, according to the invention, the efficiency of reading the information out of the optical card can be improved as compared with the known method. In the known method, although the first or second actual data record region can be read out correctly, if the first or second directory data record region can be not be read out correctly, errors still result.

The present invention is not limited to the embodiment explained above, but many modifications and alternations may be conceived by those skilled in the art within the scope of the invention. For instance, in the above embodiment, on the optical card there are provided two directory data record regions and two actual data record regions, but according to the invention more than two directory data record regions and more than two actual data record regions may be provided. Further, the optical record medium may be formed by an optical disk instead of the optical card.

As explained above in detail, in the information recording and/or reproducing method according to the invention, a plurality of directory data including the position data denoting the positions in a plurality of actual data record regions at which a plurality of actual data have been recorded are recorded in a plurality of directory data record regions, so that when at least one of said plurality of directory data can be read out correctly and at least one of said plurality of actual data can be correctly read out, the information can be read out positively.

What is claimed is:

1. A method of recording and/or reproducing information which includes directory data and an actual data file on an optical record medium having a plurality of directory data record regions and a plurality of actual data record regions, the method comprising the steps of:
   (a) recording a copy of the actual data file in each of said plurality of actual data record regions so that plural copies of said actual data file are recorded in said plurality of actual data record regions;
   (b) forming a directory data block including position data denoting positions in said plurality of actual data record regions at which said copies of the actual data file have been recorded;
   (c) recording a copy of said directory data block in each of said plurality of directory data record regions so that plural copies of said directory data block are recorded in said plurality of directory data record regions;
   (d) reading at least one of said copies of the directory data block from at least one of said plurality of directory data record regions; and
   (e) reading one of said copies of the actual data file from one of said plurality of actual data record regions under control of the position data included in the directory data block.

2. A method according to claim 1, wherein step (a) comprises judging whether said copies of the actual data file are recorded correctly or not, and if it is judged that the actual data file has not been correctly recorded in one of the plurality of actual data record regions, altering a track in the one of the plurality of actual data record regions on which the actual data file has not been correctly recorded and recording the actual data file in the altered track in said one of the actual data record regions.

3. A method according to claim 2, wherein step (c) comprises (i) judging whether or not the copy of the directory data block has been correctly recorded in one of said plurality of directory data record regions; (ii) if the copy of the directory data block is judged not to be recorded correctly in step (i), altering a sector number or track number in said one of the plurality of directory data record regions on which the directory data block has not been correctly recorded and (iii) recording the copy of the directory data block in the altered sector or track in said one of the plurality of directory data record regions.

4. A method of recording information including directory data and an actual data file on an optical record medium having a plurality of directory data record regions and a plurality of actual data record regions, the method comprising the steps of:
- (a) recording a copy of the actual data file in each of said plurality of actual data record regions;
- (b) forming a directory data block including position data denoting positions in said plurality of actual data record regions at which said copies of the actual data file have been recorded; and
- (c) recording a copy of said directory data block in each of said plurality of directory data record regions.

5. A method of recording an actual data file on an optical record medium formed by an optical card having first and second directory data record regions and first and second actual directory regions, said method comprising the steps of:
1) recording the actual data file in the first actual data record region;
2) judging whether or not the actual data file is recorded correctly in the first actual data record region;
3) altering a track in the first actual data record region when it is judged that the actual data file is not recorded correctly in the first actual data record region;
4) repeating steps 1) to 3) until the actual data file has been correctly recorded in the first actual data record region;
5) recording the actual data file in the second actual data record region;
6) judging whether or not the actual data file is recorded correctly in the second actual data record region;
7) altering a track in the second actual data record region when it is judged that the actual data file is not recorded correctly in the second actual data record region;
8) repeating steps 5) to 7) until the actual data file has been correctly recorded in the second actual data record region;
9) forming a directory data block including position data denoting tracks in the first and second actual data record regions on which said actual data file has been judged to be correctly recorded;
10) recording the directory data block in the first directory data record region;
11) judging whether or not the directory data block is recorded correctly in the first directory data record region;
12) altering a sector or track in the first directory data record region when it is judged that the directory data block is not recorded correctly in the first directory data record region;
13) repeating steps 10) to 12) until the directory data block has been correctly recorded in the first directory data record region;
14) recording the directory data block in the second directory data record region;
15) judging whether or not the directory data block is recorded correctly in the second directory data record region;
16) altering a sector or track in the second directory data record region when it is judged that the directory data block is not recorded correctly in the second directory data record region; and
17) repeating steps 14) to 16) until the directory data block has been correctly recorded in the second directory data record region.

6. A method of reproducing information recorded on an optical record medium having a plurality of directory data record regions and a plurality of actual data record regions, said plurality of actual data record regions having recorded therein a plurality of copies of an actual data file and said plurality of directory data record regions having recorded therein a plurality of copies of a directory data block including position data denoting positions in said plurality of actual data regions at which said copies of the actual data file have been recorded, said method comprising the steps of:
1) reading the directory data block recorded in one of said plurality of directory data regions;
2) judging whether or not the directory data block has been correctly read out of said one of said plurality of directory data record regions;
3) repeating steps 1) and 2) for different ones of said plurality of directory data regions until the directory data block is judged to be correctly read out the optical record medium; and
4) reading the actual data file recorded in one of said plurality of actual data record regions under control of the position data included in said directory data block.

7. A method of reproducing data stored in an optical record medium formed by an optical card having first and second directory data record regions in which copies of a directory data block are recorded and first and second actual data record regions in which copies of an actual data file are recorded, said method comprising the steps of:
- (a) reading the directory data block recorded in the first directory data record region;
- (b) judging whether the directory data block is read out correctly or not;
- (c) if it is judged that the directory data block is read out correctly:
  - i) reading the actual data file recorded in the first actual data record region under control of position data included in the directory data block;
  - (ii) judging whether or not the actual data file is correctly read out of the first actual data record region; and
  - (iii) reading the actual data file recorded in the second actual data record region under control of the position data included in the directory data block if the actual data file is judged not to be read out correctly;
- (d) reading the directory data block recorded in the second directory data record region when the directory data block is judged not to be read out correctly from the first directory data record region;
- (e) reading the actual data file out of the first actual data record region under control of the position data included in the directory data block read out of the second directory data record region;

(f) judging whether or not the actual data file can be correctly read out of the first actual data record region; and (g) reading the actual data file from the second actual data record region when it is judged that the actual data file has not been correctly read out of the first actual data record region.

* * * * *